(12) United States Patent
Brenneman et al.

(10) Patent No.: US 7,630,778 B2
(45) Date of Patent: Dec. 8, 2009

(54) SYSTEMS AND METHODS FOR ANALYSIS AND SIMULATION OF PACKAGE NET CONTENT DECISIONS

(75) Inventors: William Anthony Brenneman, Mason, OH (US); Brent Jay Bumgarner, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 626 days.

(21) Appl. No.: 11/369,594

(22) Filed: Mar. 7, 2006

(65) Prior Publication Data
US 2007/0213850 A1 Sep. 13, 2007

(51) Int. Cl.
*G06F 19/00* (2006.01)
(52) U.S. Cl. .................................. 700/30; 700/49
(58) Field of Classification Search .............. 700/30–3, 700/45, 50, 503
See application file for complete search history.

(56) References Cited

U.S. PATENT DOCUMENTS 4,792,913 A * 12/1988 Buckland et al. ............... 708/3
6,432,361 B1 * 8/2002 Rothberg et al. ............ 422/68.1

OTHER PUBLICATIONS

Valavants et al., On the Hierarchical Modeling analysis and Simulation of Flexible Manufacturing system with Extended Petri Nets, IEEE, p. 94-110.*
Elder, Robert S. And H. David Muse, "An Approximate Method for Evaluating Mixed Sampling Plans", *Technometrics*, Aug. 1982, pp. 207-211, vol. 24, No. 3.

* cited by examiner

*Primary Examiner*—Kidest Bahta
(74) *Attorney, Agent, or Firm*—Jay A Krebs; Leonard W Lewis

(57) ABSTRACT

The present invention comprises a method for determining a set of fill conditions for packaged goods. More particularly the present invention comprises a method for modeling a preferred set of fill conditions for packaged goods considering relevant regulatory and cost constraints, including the steps of: obtaining a historical data set; determining a sampling manufacturing period; obtaining a variance model; selecting a variance estimation technique; and then determining a variance component set using the variance model, the estimation technique, and the historical data set. A first target can then be calculated by obtaining: a first constraint set; a first probability; a product data set; and optionally a first confidence level. The first target is then calculated utilizing the variance component set such that the likelihood under the first constraint set is at least as great as the first probability with the first confidence level, if employed. Subsequently a report related to the first target may be generated and/or displayed.

21 Claims, 2 Drawing Sheets

SYSTEMS AND METHODS FOR ANALYSIS AND SIMULATION OF PACKAGE NET CONTENT DECISIONS

FIELD OF THE INVENTION

The present invention relates to systems and methods for determining product fill parameters.

BACKGROUND OF THE INVENTION

Manufacturers of prepackaged foods and consumer goods must contend with a variety of issues that have implications for product and packaging decisions. One such issue is the need to comply with governmental regulations relating to product net contents in the markets' in which the prepackaged foods and consumer products are sold. Prepackaged foods and consumer products are required to be labeled in a manner indicating the net contents of the package. Regulatory agencies conduct frequent, random inspections of products to ensure that the actual average net contents of the products being sampled is at or above the labeled net content value, and that any given package does not deviate beyond a prescribed amount from the labeled net content. Failed inspections can result in significant penalties and other adverse consequences for the manufacturer.

Another issue facing manufacturers is the expectations and reactions of consumers' with respect to product aesthetics, particularly the consumer's perception that they are receiving a sufficient (e.g., "fair") quantity of the prepackaged foods and consumer goods for the amount of money paid. It is not uncommon for products and food stuffs, even though in compliance with net content regulations, to appear to be underfilled because of factors such as product settling, product moisture loss, escaped product, and product packaging configuration and construction (e.g., transparency or translucency, voids, and the like). Moreover, manufacturers recognize that package filling processes comprise inherent variations in efficacy, meaning that some packages will be filled below the declared net contents.

To compensate for such process variations, to ensure that the prepackaged food and consumer good products contain sufficient product to pass inspection, and to satisfy a consumer's product aesthetic expectations, manufacturers typically fill packages with additional product ("overfill"), at significant cost. The problem remains, therefore, how to better understand the contributions that specific elements of variance in the product fill processes make to the total variation in actual product net contents from the intended net content of the product.

The present invention offers systems and methods for identifying and predicting product fill process variations in order to satisfy product net content regulations and the product aesthetic expectations of consumers. The present invention additionally provides systems and methods for identifying and predicting the cost implications associated with product fill decisions.

SUMMARY OF THE INVENTION

The present invention comprises a method for determining a set of fill conditions for prepackaged products and commodities. More particularly, the present invention comprises a method for modeling a preferred set of fill conditions for prepackaged products and commodities considering relevant regulatory and cost constraints. The method comprising the steps of: (i) obtaining a historical data set; (ii) determining the sampling manufacturing period; (iii) obtaining a variance model; (iv) selecting an estimation technique, and then (v) estimating a variance component set using said variance model, said estimation technique and said historical data set. A first target is then determined by: (a) obtaining a first constraint set; (b) obtaining a first probability; (c) optionally obtaining a first confidence level; (d) obtaining a product data set; and then calculating said first target utilizing said variance component set such that the probability (i.e., likelihood) of satisfying the first constraint set is at least as great as said first probability, with the first confidence level, if applicable. Subsequently, a report related to the first target may be generated and/or displayed.

DETAILED DESCRIPTION OF THE INVENTION

The novel package fill planning methods and systems of the present invention are useful in conducting modeling and simulation analyses. The novel package fill planning methods and systems of the present invention are particularly useful in modeling cost structures associated with specific product packaging decisions. These package fill planning methods and systems are also particularly useful for predicting the probability that a given sample of packages will successfully comply with applicable regulations related to net contents.

As used herein. The term "net content" refers to a measure of the overall content of product contained within a package. Net content may be measured by volume, weight, dimension, density, number of included units, or combinations thereof.

The modeling and simulation systems and methodologies of the present invention can be used in making package fill decisions for prepackaged products and commodities, in a variety of different package configurations, under any known regulatory constraints.

Figure 1:
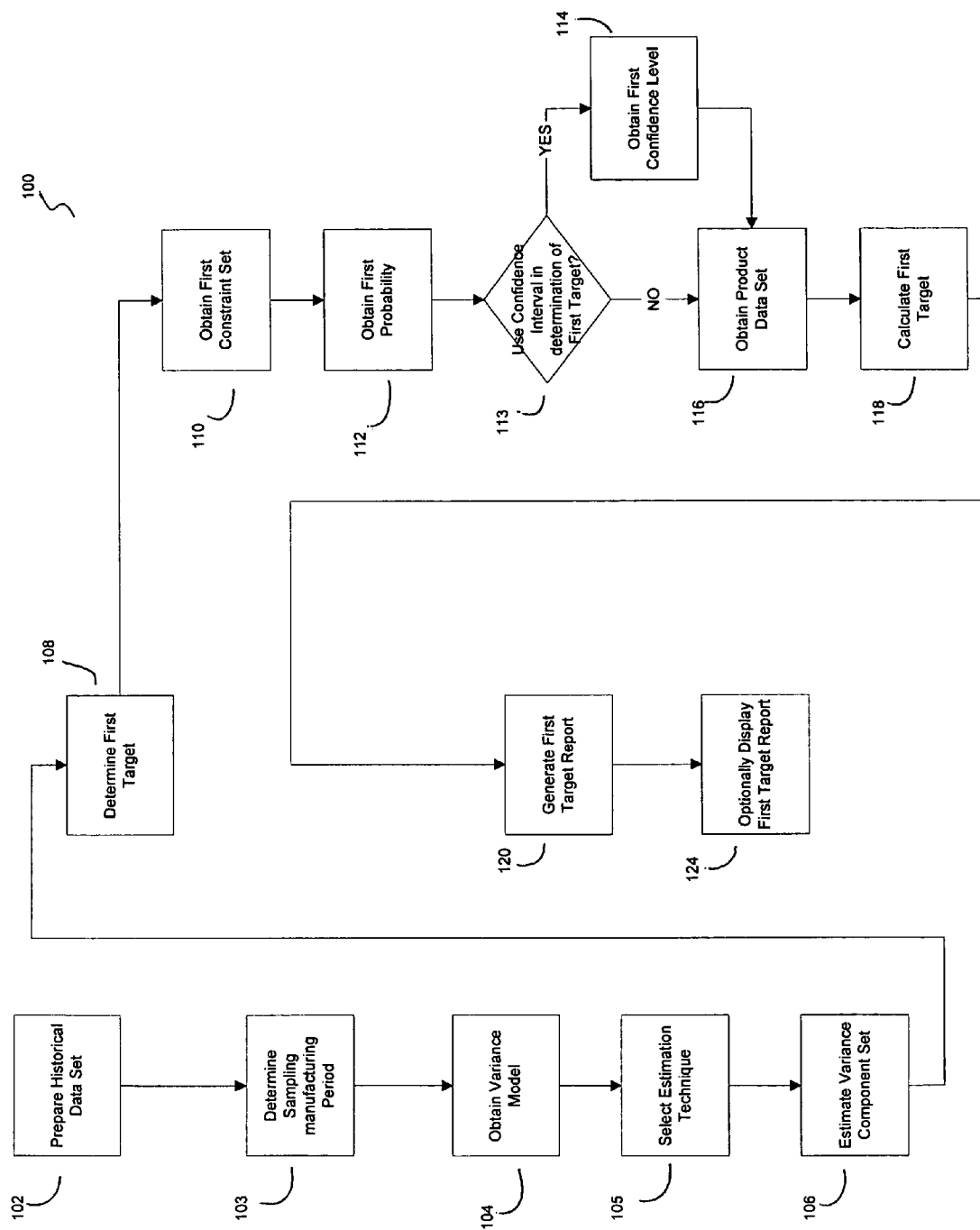
FIG. 1 is a workflow diagram depicting schematically one embodiment of a method of the present invention.

The present invention can be understood by following the steps discussed below in conjunction with the workflow in FIG. 1. The workflow in FIG. 1 depicts elements associated with the simulation and modeling methods of the present invention, starting with the step of preparing a historical data set (Step 102). As used herein the term "historical data set" refers to a set of observed time series data corresponding to the actual fill weight data measurements over a period of time. The amount of historical data used to generate the historical data set should be adequate to fully describe actual process capabilities of the product fill processes of interest. The select period of time over which historical data is collected and used should be adequate to reflect the affect of changeovers; equipment maintenance; variations in product and material weight, density and specific gravity; operator adjustment; and the like on product fill variation. It is preferred that the amount of historical data be no less than the frequency of setting/checking targets. In one embodiment of the present invention, product fill production targets are set on a monthly basis, and the historical data set comprises at least a months worth of historical data. In another embodiment of the present invention product fill production targets are set on a quarterly basis, and the historical data set comprises at least three months worth of historical data. In yet another embodiment of the present invention product fill production targets are established on an annual basis, and the historical data set comprises at least twelve months worth of historical product fill data.

In addition to preparing the historical data set (Step 102), it is also necessary to select the sampling manufacturing period (Step 103). This may occur prior to, in conjunction with, or following preparation of the historical data set. As used herein, the term "Sampling Manufacturing Period" refers to the period of time which the products to be sampled and inspected from a given store or location are believed to have been manufactured. Many factors contribute to this determination, including: total shelf space available and/or allotted for the particular product to be inspected; product sales velocity; package, case and/or pallet design (e.g., how many individual packages per case, pallet or other unit of manufacture or shipping); individual package dimensions (e.g., how many individual packages may fit within the space available and/or allotted for the product on the shelf; out of stock frequency and reordering and restocking practices; the distributor's and/or retailer's product distribution and warehousing practices; and the distributor's and/or retailer's inventory management practices (e.g., FIFO, LIFO, and the like).

Prior to, in conjunction with, or following preparation of the historical data set and determination of the sampling manufacturing period, a variance model is obtained or selected (Step 104). As used herein, the term "variance model" refers to a mathematical model for determining one or more variance components. As used herein, the term "variance component" refers to a period of time in which the cause of the deviation in product net content from the targeted net content typically originates. For example, in product fill processes that utilize a plurality of filler heads, a large part of deviations between the fill target and the actual fill condition can often be attributed to variations between the performances of the individual filler heads, which would be part of a short term variance component.

Though the variance model may comprise any number of variance components (e.g., form 1 to n) that the system operator may feel are necessary to account for all sources of variance in a packaging fill process, typically less that 10 variances components are utilized. In certain embodiments of the present invention less than 5 variance components are utilized in the variance model. In other embodiments, 4 or fewer variance components are utilized. In another embodiment of the present invention the variance model comprises two variance components, corresponding to short term and long term time periods. In yet another embodiment the variance model comprises one variance component corresponding to a short term time period.

In yet another embodiment of the present invention the variance model comprises three variance components to describe the three main sources of variation in the product fill process; short term variance (also known as within-Hour variation), intermediate term variance (also known as Hour-to-Hour variation), and long term variance (also known as Day-to-Day variation or Lot-to-Lot variation). Accordingly, suitable variance models for use in the systems and methods of the present invention include: variance models for determining within-Hour variation; variance models for determining within-Hour and Hour-to-Hour variation; variance models for determining within-Hour and Day-to-Day variation; and variance models for determining within-Hour, Hour-to-Hour, and Day-to-Day variation.

The presence of Day-to-Day variation indicates that the process mean is moving from day to day, and is a long term component of overall variation. Hour-to-Hour variation indicates that the process mean is moving from hour to hour. Within-Hour variation is the variation that is evident from sample to sample.

In determining which variance model to employee in the methods and systems of the present invention it is also necessary to determine if the product fill processes under analysis are or are not within statistical control. If the product fill process under examination is not within statistical control then the amount of Day-to-Day variation and Hour-to-Hour variation will impact the determination of the first target, and correspondingly the probability of passing any inspection of the package contents.

In one embodiment of the present invention a system for performing the methods described herein allows an operator to select from a plurality of suitable variance models. In another embodiment of the present invention multiple systems are available, each designed to operate with a given variance model that has been "built-in to" or "hard-wired into the system. In yet another embodiment of the present invention an operator has the opportunity to select and utilize a variance model not previously utilized by the system, or alternatively or in combination, modify and employ a previously utilized variance model. In each of these embodiments the new and/or modified variance model(s) may be saved by the system for future use.

Once a variance model has been selected it is necessary to select an appropriate estimation technique for the variance model (Step 105). Suitable variance model estimation techniques include: expected mean squares, maximum likelihood; and restricted maximum likelihood. In one embodiment of the present invention a restricted maximum likelihood estimation technique is employed with a variance models for determining within-Hour, Hour-to-Hour, and Day-to-Day variation. In another embodiment of the present invention an expected mean squares estimation technique is employed with a variance models for determining within-Hour and Hour-to-Hour variation. In yet another embodiment of the present invention a maximum likelihood estimation technique is employed with a variance models for determining within-Hour variation.

In certain systems for performing the methods of the present invention an operator may select from a plurality of suitable estimation techniques for use with the desired variance model(s). In another embodiment of the present invention multiple systems are available, each designed to employ a specific estimation technique that has been "built-in to" or "hard-wired into" the system with either a selected (machine or operator selected) or predetermined (by system design and construction) variance model. In yet another embodiment of the present invention the operator has the opportunity to select and utilize an estimation technique not previously utilized by the system, or alternatively or in combination, modify and employ a previously utilized estimation technique. In each of these embodiments the new and/or modified estimation technique may be saved by the system, either automatically or at the direction of the operator, for future use.

Subsequent to the preparation of the historical data set (Step 102), the selection of the variance model (Step 104), and the selection of an estimation technique (Step 105), a variance component data set is determined (Step 106) by applying the selected variance model (Step 104), using the selected estimation technique (Step 105), to the historical data set of (Step 102). As used herein, the term "variance component set" refers to the estimated variance components of interest (e.g., Day-to-Day variation (also known as Lot-to-Lot variation); Hour-to-Hour variation within days; and/or within-Hour variation) that are part of the selected variance model, experienced over the term of the historical data set.

In one embodiment of the present invention the variance model is modified prior to the calculation of the variance component set to account for the use of a checkweigher in the collection of the data in the historical data set. As used herein, the term "checkweigher" refers to a measuring device that weighs each individual package after filling, and either accepts or rejects the package based on a predefined set of weighing criteria. Packages that are rejected are not counted in the historical data set. It will be understood by those of ordinary skill in the art that the term "checkweigher," though titled and described as a device accepting or rejecting an individual package based on package fill weight, is in fact capable of measuring, and subsequently making a rejection or acceptance determination based upon such measurement, any product net content criteria (e.g., volume, weight, dimension, density, number of included units, or combinations thereof). Accordingly, use of the term "checkweigher" is not intended to limit the scope of the applicability of such a device to only situations examining product fill weight.

It is contemplated by the inventors of the present invention that the variance component set for a given historical data set may have been previously determined. In one embodiment of the present invention the system will prompt the user to identify the variance component set to be used, or to have the system calculate the variance component set in the manner previously described. In another embodiment of the present invention the system operator is prompted by the system to specify the format of the previously estimated variance component set so that it may be accurately read and used by the system. In yet another embodiment the systems of the present invention are able to automatically determine the format of the previously estimated variance component set and make format conversions, if necessary, so that the variance component set may be accurately read and used.

It will be understood by one of ordinary skill in the art that the system of the present invention may be designed so as to prompt the operator to confirm the use of a checkweigher, with the system making whatever adjustments are necessary based on the response. Alternatively, the system may automatically make the necessary adjustments in the calculation of the variance component set if it is already known that a checkweigher has been employed in collecting the data within a given data set. In one embodiment of the present invention the data file containing the historical data set comprises meta data, wherein said meta data contains information corresponding to the use of a checkweigher in the collection of that given historical data set. The system, prior to calculating the variance component set, reads or otherwise interrogates the meta data to determine if a checkweigher was employed, and modifies the calculation of the variance component set accordingly.

Once the variance component set has been estimated, a first target may be determined (Step 108, which). Those of ordinary skill in the art will understand upon reviewing the disclosure herein that the step of determining the first target (Step 108) itself comprises several sub-steps of obtaining a first constraint set (Step 110); obtaining a first probability (Step 112); obtaining a first confidence level (Step 114); obtaining a product data set (Step 116) and then actually calculating the first target (Step 118), and that not all of these sub-steps need to be performed contemporaneously with the determination of the first target.

As used herein, the term "first target" refers to a calculated mean product fill value such that upon inspection, the sample of measured product fill values will have a given probability ("first probability"), with a given confidence level ("first confidence level"), if applicable, of passing the requirements in the given constraint set ("first constraint set"), for a given variance component set and product data set.

In determining the first target it is necessary to identify and obtain a first constraint set (Step 110). As used herein, the term "constraint set" refers to a given set of criteria and/or regulations, related to a given product type, to which compliance must be ensured. These constraints and/or regulations may be internally imposed (e.g., self constraints for product aesthetics and/or promotions), or may be externally determined, such as governmental regulations and guidelines. It will be understood by one of ordinary skill in the art that the first constraint set may in fact contain multiple sets of constraints selected from the group consisting of regulatory and/or governmental constraints, self constraints for product aesthetics, self constraints for product promotions and combinations thereof.

In one embodiment of the present invention the products under analysis are prepackaged consumer goods products, and the constraint set comprises governmental regulations. In another embodiment of the present invention the products under analysis are prepackaged consumer goods products, and the constraint set comprises governmental regulations and an additional product fill constraint based on aesthetics. In yet another embodiment of the present invention the products under analysis are prepackaged consumer goods products, and the constraint set comprises governmental regulations and an additional product fill constraint based on an extra product net content promotion (e.g., "25% more").

It will also be understood that the first constraint set may also include more than one of the same type of constraint (e.g., more than one set of regulations or more than one set of self constraints for product aesthetics and/or promotions), optionally in combination with other types of constraints. In one embodiment of the present invention a product is packaged in a single location for distribution and sale in a two separate regions, each with a distinct set of package fill and labeling regulations. Both regulations are to be included in the constraint set such that, upon calculation, the first target is a value that satisfies both sets of regulations. In yet another embodiment of the present invention a given product is intended for distribution and sale in three regions with distinct regulations, and all constraint set comprises all three sets of regulations. In yet another embodiment of the present invention a given product is subject to a promotion requiring the addition of 25% additional product, and intended for sale in two separate regions with distinct regulations. The constraint set for such example would comprise the additional product fill constraint in addition to the regulatory constraints for the two regions of intended sale.

Examples of such constraints sets include the governmental regulations found in: NIST Handbook 133, Checking the net Contents of Packaged Goods, January 2005, 4$^{th}$ ed.; Canada Weights and Measures Regulations (W-6, C.R.C. c. 1605), Aug. 31, 2004; and International Organization of Legal Metrology, 2004, Regulation 87-edition 2004. The specific constraint set will depend, in part, on the nature and type of product being analyzed, as well as the intended geography of sale and/or distribution.

The systems and methods of the present invention may employ the use of a first probability (Step 112) in determining the first target. As used herein the first probability refers to the probability that a sample of product packages, whose net contents have been provided utilizing the first target, will satisfy the requirements of the first constraint set. In one embodiment of the present invention the first probability is determined prior to system operation and/or construction and "built in to" or "hardwired into" the system. In another embodiment for the present invention a system operator may determine or provide the first probability to be utilized for a determination of a first target or series of the first target determinations. In yet another embodiment the system operator may select from a list of first probabilities the first probability to utilize for a determination of a first target or series of the first target determinations.

It will be understood by one of ordinary skill in the art that when referring to the first probability any value between 0.0 and 1.0 may be employed. The first probability includes all combinations and permutations of real integer and non-integer values in the range of from about 0.0 to about 1.0. In one embodiment of the present invention the first probability is set at a value of about 0.95, such that all determinations of first targets will be made using that value. In another embodiment of the present invention a system operator may specify the value to be used, in the range of from about 0.0 to about 1.0, for the first probability, or may optionally select a value from a predetermined list of values, itself comprising any value or combination or permutation of values from 0.0 to 1.0.

In determining the first target it is also necessary to obtain a product data set (Step 116). As used herein, the term "product data set" refers to product and package specific information related to physical characteristics and costs of the package and contents. In one embodiment of the present invention the product data set comprises information related to the given products labeled net contents; weight loss factor, production volume (in thousands of stat units); material expense per stat case (in US dollars); data set units; specific gravity (if needed); overflow capacity; residual weight, additional product fill; and checkweigher reject limit (if applicable). The product data set may also include information related to the distribution costs of a product, such that transportation costs related to product fill decisions may be calculated. In one embodiment of the present invention cost distributions are provided based on the product net content criteria of examination. In this way, additional product cost from product net fill decisions may be more accurately calculated.

The systems and methods of the present invention may optionally employ the use of a first confidence level (Step 114) in determining the first target. The use of the first confidence level provides an additional level of assurance that packages filled using the first target will pass any inspection. The first confidence level includes all combinations and permutations of real integer and non-integer values in the range of from about 0% to about 100%. In one embodiment of the present invention the first confidence level is the range of from about 50% to about 100%. In another embodiment the first confidence level is in the range of from about 80% to about 99%. In yet another embodiment the first confidence level is in the range of from about 90% to about 99%.

In one embodiment of the present invention a first confidence level is not employed in the calculation of the first target, such that the first target refers to a calculated mean product fill value such that upon inspection, the probability of passing the requirements of the first constraint set will be at least as great as the first probability, for a given variance component set and product data set. In another embodiment of the present invention a first confidence level is employed, where the first confidence level is fixed within the system at a value 95%, or some other value. In such an embodiment the first target refers to a calculated mean product fill value such that upon inspection, the probability of passing the requirements of the first constraint set will be at least as great as the first probability, with a given confidence level of 95% (or another fixed value if the confidence level was fixed at something other than 95%), for a given variance component set and product data set. In yet another embodiment of the present invention the first confidence level may be selected and inputted by the system operator, or selected from a range of predefined probabilities.

Calculation of the first target (Step 118) may occur using a variety of techniques. In one embodiment of the present invention the first target is calculated according to a closed form equation or numerical methods, where the target is a function of the first constraint set; the first probability; first confidence level, if employed; the product data set; sampling manufacture period; variance model; variance component set; and the historical data set. In another embodiment of the present invention the first target is calculated through a process of successive simulations that incorporate a numerical search for the minimum target value that delivers at least a first probability, which the first confidence level if employed, under the first constraint set and product data set, assuming a certain sample manufacturing period, variance model, variance component set and historical data set.

In one embodiment of the present invention that employs simulation the probability of satisfying a given regulation constraint set using a given first target value is determined by first randomly selecting n observations from a selected distribution determined by the current target and variance component set. Then a determination is made to see if the n observations satisfy the regulation constraint(s). The process of random selection of n observation and determination of satisfying the constraint(s) is repeated m times, where the probability that a given first target will satisfy the constraint (s) is determined by taking the number of times the sample of n observations passed the constraint(s) divided by the value m.

In another embodiment of the present invention that employs simulation a root-finding algorithm, such as a bi-section algorithm, is employed to find a first target value that gives a probability approximating the first probability, with a given degree of precision. At each step of the root-finding algorithm the actual probability of satisfying the constraint(s) is determined using the process of the previous example.

It will be understood by those of ordinary skill in the art that the values, or range of values for n and m in the preceding examples may be predetermined, user provided, user selected, or combinations thereof. In one embodiment of the present invention the value n is in the range of from about 1 to about 50. In another embodiment of the present invention the value n is in a range of from about 1 to about 20. In yet another embodiment of the present invention the value n is in the range of from about 5 to about 15.

In one embodiment of the present invention the value m is in the range of from about 1 to about 1,000,000. In another embodiment of the present invention the value of m is in the range of from about 20,000 to about 800,000. In yet another embodiment of the present invention the value of m is in the range of from about 30,000 to about 400,000. In yet another embodiment of the present invention the value of m is in the range of from about 30,000 to about 200,000.

Once the first target has been calculated (Step 108) a first target report is calculated (Step 120). As used herein, the term "first target report" refers to an electronic or hard copy representation of the first target. The first target report may be visual and/or auditory in nature, so long as it communicates the first target value.

In one embodiment of the present invention the manufacturing system is integrated with the systems for employing the analysis and simulation methods of the present invention, such that the manufacturing conditions to achieve a given product fill target are automatically adjusted in response to calculated first target value.

Though designed to communicate a calculated mean product fill value ("first target") such that upon inspection, the probability of passing (i.e., satisfying) the requirements of the first constraint set will be at least as great as the first probability, with a given confidence level ("first confidence level"), if applicable, for a given variance component set and product data set, the first target report may also comprise additional information.

One of ordinary skill in the art will appreciate that, depending on the information contained within the product data set, the systems and methods of the present invention may also be employed to simulate financial results of certain product fill decisions. Alternatively, or in addition, the systems and methods of the present invention may be used to demonstrate the financial results of changes in statistical accuracy in the product manufacturing/filling process.

In one embodiment of the present invention the product data set comprises financial information related to product cost, including per unit costs and/or transportation costs. In addition to calculating the first target, the system additionally calculates the financial result of changes related to use of the first target in the manufacturing/filling process. Said financial results may be shown as an absolute value and/or a relative value, (i.e., versus previously utilized product fill targets). In another embodiment the system of the present invention allows an operator to add cost as a constraint to the calculation of the product fill target, calculating, and then displaying in the first target report, the optimum product fill target that may be achieved for a given cost.

The first target report, in addition to comprising the first target value and financial data related thereto, may optionally comprise summaries of all information employed in the generation of the first target. In one embodiment of the present invention the first target report comprises the first target, financial implications for adjusting the current manufacturing/filling process to utilize the first target, and summaries of the first probability, first confidence level, and the product data set.

Once the first target report is generated (step 120) it may optionally be displayed (Step 124) to the system operator or some other audience. One of ordinary skill in the art will appreciate that there is no requirement that the first target report be displayed contemporaneously with its generation. In one embodiment the first target report is in an electronic format and is stored in a database where it may be retrieved and reviewed at some future date. As previously detailed the first target report may exist in either visual or auditory form, or both. In one embodiment of the present invention the first target report comprises an auditory representation of the first target and other information contained therein, and is displayed when such auditory representation is rendered audible. In another embodiment the first target report is in the form of a spreadsheet comprising first target and other information contained therein, and may be displayed on a monitor and/or printed in hard copy format.

Figure 2:
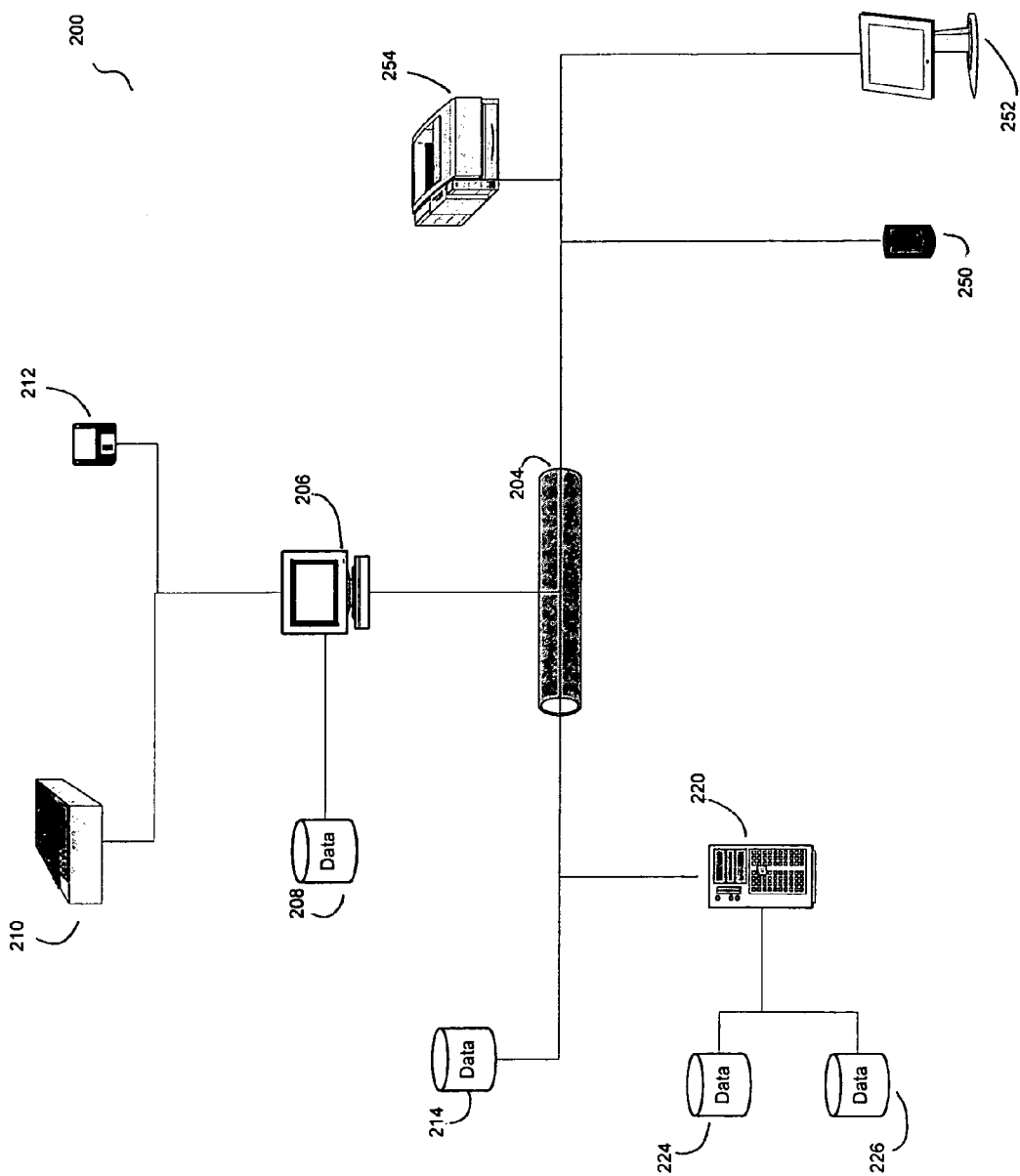
FIG. 2 is a schematic diagram showing one configuration of a system for employing the methods of the present invention.

FIG. 2 represents a schematic diagram of a system for employing the methods of the present invention. The various elements of system 200 communicate over network 204. In one embodiment of the present invention network 204 is a proprietary local area network. It is contemplated, however, that network 204 may comprise, either alone or in combination, proprietary and non-proprietary elements. It is also contemplated that communication over network 204 may occur by means of both wired and wireless technologies, such as coaxial, fiber optic, Ethernet, dial-up, satellite up-link/down-link, Wi-Fi, Bluetooth, and the like.

In one embodiment of the present invention system 200 is a web-based, networked system that operates over a proprietary network 204 comprised of coaxial, fiber optic, Wi-Fi, Ethernet, and Bluetooth components. In another embodiment of the present invention system 200 is a web-based, networked system comprising at least two proprietary network hubs that comprise coaxial, fiber optic, Wi-Fi, Ethernet and Bluetooth components, and communication between the proprietary network hubs occurs over the non-proprietary Internet.

In web-based system 200 a system operator (not shown), located at workstation 206, is in communication with network 204. The system operator prepares the historical data set from historical production data, which is acquired by system 200 via a historical data set acquisition device. The manner of preparation of the historical data set depends on the format of the historical data itself. Acquisition of the historical data may occur via manual entry at workstation 206, or some other device for data-input (e.g., speech-recognition) connected to system 200; scanning of hard-copy historical data into system 200 via scanner 210 and subsequent conversion into a usable format through object character recognition; uploading from removable and/or portable storage device 212; or retrieval from data storage device 208. It is hereby contemplated that the historical data may exist in a variety of formats, requiring use of one or more of the data acquisition methods herein described.

Once all necessary historical data is acquired the historical data set may be prepared and acquired by system 200 via the historical data set acquisition device. In one embodiment of the present invention each historical data set, upon preparation, and the supporting historical data itself, are stored for future use in data storage device 214, which is in communication with the elements of system 200 via network 204. Once prepared and stored, the historical data set may be retrieved for future use in analysis and simulation processes of the present invention. It is contemplated that if an appropriate historical data set has been previously prepared and available for use, then Step 102 of FIG. 1 of preparing a historical data set may be satisfied by retrieving said appropriate historical data set from data storage device 214 and making it available for use in one or more of the processes of the present invention. This process may occur via a graphical, web-based user interface.

As previously disclosed, Step 104 of FIG. 1 details the selection of a variance model to be used in the processes of the present invention. System 200 comprises a variance model acquisition device for acquiring one or more variance models. System 200 may be structured such that the selection of the variance model is automatic, either depending on the format or type of historical data in the historical data set, or because each execution of system 200 uses a pre-selected, pre-programmed variance model. In one embodiment of the present invention system 200 comprises a single variance model that is used for all analysis and simulation processes, and is pre-programmed into the system such that the operator does not have to affirmatively select the variance model. In another embodiment of the present invention, however, numerous variance models have been pre-programmed into system 200, stored on data storage device 214 and are available for use. The operator in such an embodiment is presented with an option, via a graphical, web-based user interface, to select the desired variance model, thereby indicating to system 200 what variance model to employ.

It will be understood by one of ordinary skill in the art that though discussion of multiple embodiments of the present invention make reference to a single data storage device 214, data storage device 214 may actually comprise multiple data storage devices of different types (removable, portable, ROM, RAM, and then like). It will also be understood that each of the devices generically referred to as data storage device 214 may be located throughout system 200, and do not have to be in constant communication with each other over network 204. It will also be understood that each of the devices generically referred to as data storage device 214 do not have to be solely dedicated to the task of data storage within system 200, but may perform this function for other systems not contemplated as part of the present invention (e.g., local, swappable, sharable hard drives on personal computers and servers).

System 200 contemplates the existence of mathematical processing capabilities integral with the system operator's workstation 206, or located remotely there from, such as processor 220. These mathematical processing capabilities, including processor 220, may be another workstation, a dedicated processing device (such as a mainframe, server or cluster of servers or mainframes), or any other device capable of performing the function of estimating the variance component set from the variance model and the historical data set detailed in Step 106 of FIG. 1. Though in one embodiment of the present invention the mathematical processing capabilities are described as a remotely located portion of system 200 (processor 220), it is also contemplated that these processing capabilities may be a component of work station 206, such as workstation 206's internal processor. As used herein, the generic term "work station" refers to any computing device capable of accessing and interacting with system 200 in the manner contemplated and described herein. Suitable devices include personal desk-top, lap-top and notebook computers; palm held and tablet based digital assistants and computing devices; servers and mainframe computers; and the like.

The variance component set, once estimated, may be stored in data storage device 214 and retrieved for subsequent use by a variance component set acquisition device. It is also contemplated that the variance component set may have previously been estimated and stored, such that retrieval from data storage device 214 for use is all that would be required for use in the processes of the present invention.

It is contemplated by the inventors that certain elements of the present invention (e.g., historical data, historical data set, variance model, variance component set, first target, and first target report) may comprise meta data, which can be used by the system and/or the system operator to associate certain elements with specific other elements. In one embodiment of the present information the meta data of a given variance data set comprises information regarding what variance model was used to estimate that given variance component set. In another embodiment of the present invention the first target report comprises meta data which itself comprises information regarding the specific historical data set, variance model, and variance component set used in its generation.

As used herein, the term "meta data" refers to any user or machine readable information that describes or otherwise identifies the content, source, author, relationship, linking, accessibility, limitations and/or location of other data. Meta data may be embedded in or detached from the data to which it relates.

The first probability and the first confidence level, if any, used by system 200 to determine the first target may be selected by the operator, selected automatically by the system based on information contained in meta data, or be pre-selected and unchangeable by either design or operation of the system. In one embodiment of the present invention system 200 is designed and constructed such that the first probability is set at about 0.95. In another embodiment of the present invention system 200 is designed and constructed such that the first probability is about 0.95 and the first confidence level is about 95%. In yet another embodiment of the present invention the system operator, via a graphical, web-based user interface, is allowed to select the first probability and/or the first confidence level from a range of options. Combinations and permutations of first probabilities in the range of from about 0.0 to about 1.0, and first confidence levels, if employed, in the range of from about 0% to about 100%, are hereby contemplated by the present invention.

The constraint set used may be manually inputted by the system operator via manual entry at workstation 206, or some other device for data-input (e.g., speech-recognition) connected to system 200; scanning of hard-copy constraint sets into system 200 via scanner 210 and subsequent conversion into a system usable format through object character recognition; uploading from removable and/or portable storage device 212; or retrieval from any of data storage devices 208, 214, 224, and/or 226. It is hereby contemplated that the constraint set may exist in a variety of formats, requiring use of one or more of the data acquisition methods herein described. It is contemplated that the constraint set may alternatively have been previously prepared in a format suitable for use in system 200. It is also contemplated that one or more constraint sets have been previously prepared and stored on one or more of data storage devices 214, 224, and/or 226. The constraint set may also be located on local storage device 208 and made available, either automatically or through the action of a system operator, to system 200.

In one embodiment of the present invention the constraint set is made available to system 200 through a subscription service, either in direct communication with system 200 over network 204, or in some other media format that has to be converted to a system usable format, or if already in such a format uploaded to system 200.

In another embodiment of the present invention the selection of the constraint set is made by a system operator through a graphical, web-based user interface. In such embodiment the system operator may select all applicable and/or desired constraint sets that shall be applied by system 200 in the determination of the first target. If multiple constraint sets are selected, the first target shall be determined by system 200 in such a way as to satisfy all selected constraint sets. It is also contemplated that system 200 may automatically select one or more applicable constraint sets to be used in the determination of the first target. Such automatic determination by system 200 may occur as a result of processor 220, acting as a system controller, responding to meta-data information (e.g., geography where the historical data set is collected) as to which constraint set(s) is(are) applicable.

The product data set used may be manually inputted by the system operator via manual entry at workstation 206, or some other device for data-input (e.g., speech-recognition) connected to system 200; scanning of hard-copy constraint sets into system 200 via scanner 210 and subsequent conversion into a system usable format through object character recognition; uploading from removable and/or portable storage device 212; or retrieval from any of data storage devices 208, 214, 224, and/or 226. It is hereby contemplated that the product data set may exist in a variety of formats, requiring use of one or more of the data acquisition methods herein described. It is contemplated that the product data set may alternatively have been previously prepared in a format suitable for use in system 200. It is also contemplated that one or more product data sets have been previously prepared and stored on one or more of data storage devices 214, 224, and/or 226. The product data set may also be located on local storage device 208 and made available, either automatically or through the action of a system operator, to system 200.

In will be understood by one of ordinary skill in the art that though the various embodiments of the systems and methods of the present invention described herein are detailed as being operated by a system operator, one or more of the functions performed by said operator can in fact be automated and performed by one or more of the components of network system 200 under the direction of processor 220. In one embodiment of the present invention the act of compiling data for and preparing the historical data set is automated, whereby historical data is monitored, collected, and stored automatically. In this embodiment the retrieval of such stored historical data, format conversion (if necessary) and preparation of the historical data set in a format acceptable for use are also performed automatically. Each of these tasks may be controlled by processor 220 which in this capacity is serving as a system controller.

In another embodiment of the present invention the display of the generated first target report to various display devices is also automated. It is contemplated that the manner and timing of the automated display of the first target report may occur in accordance with a pre-set default, or may be customizable (e.g., format, timing, display device, etc.) based on user preferences. In yet another embodiment of the present invention a user of system 200, authorized to see the first target report, may designate the device on which the first target report is to be displayed. Suitable devices for displaying the first target report include hand held computing devices and digital assistants 250; monitors, televisions and other visual display devices 252, or printer 254 for producing a hard copy on printer-suitable media such as paper. Other devices suitable for displaying the first target report include facsimile transmission devices (designated and shared function), auditory devices capable of converting text to speech, and visual displays in communication with portable, desktop and/or server based computers, connected to network 204. In one embodiment of the present invention the first target report, either as it is being generated or at some time thereafter, is formatted to be viewed on the display of a computer work station of a user of system 200. Once the first target report is formatted for viewing, processor 220, serving as a system controller, sends an e-mail notification that said first target report is available for viewing. Upon receiving said notification, the system user may log-in to system 200 and view the first target report on a web page. In another embodiment of the present invention the first target report, either as it is being generated, or at some time thereafter, is formatted for use and viewing in one of a plurality of file formats suitable for use in commercially available spreadsheet and/or database applications.

In one embodiment of the present invention there exists a system for package fill determination comprising a system controller; a data storage element; a historical data set acquisition element; a sampling manufacturing period acquisition element; a variance model acquisition element; a estimation technique acquisition element; a variance component set acquisition element; a first constraint set acquisition element; a first probability acquisition element; and a product data set acquisition element.

The system controller of the present embodiment obtains a historical data set via the historical data set acquisition element; acquires a sampling manufacturing period via the sampling manufacturing period acquisition element; obtains a variance model via the variance model acquisition element; and acquires an estimation technique via said estimation technique acquisition element. The system controller then determines a variance component set, acquired via said variance component set acquisition element, using said variance model, said estimation technique, and said historical data set.

The system controller determines a first target by the steps of: (i) obtaining a first constraint set via said first constraint set acquisition element; (ii) obtaining a first probability via said first probability acquisition element; (iii) obtaining a product data set via said product data set acquisition element; and (iv) calculating said first target utilizing said variance component set such that the probability of satisfying said first constraint set is at least as great as said first probability. It will be understood by those of ordinary skill in the art that the steps (i), (ii) and (iii) of the preceding sentence may occur in any sequence, and may in fact occur prior to or contemporaneously with the system controller obtaining the historical data set, the sampling manufacturing period, the variance model, the estimation technique, and the determination of the variance component set.

It will be understood by one of ordinary skill in the art that the term "system controller," depending on the exact configuration of the systems of the present invention, describes a person acting as a system operator, who manually directs the actions of the system. One of ordinary skill in the art will recognize, however, that certain portions of these manually directed tasks may in fact be automated to some degree (e.g., data location lookup, retrieval, copying, and/or processing in a manually initiated data transfer function). As used herein, the "system controller" may also describe one or more system microcontrollers, processors, and/or processing control devices, existing either independently or as part of a personal computer based device, capable of controlling the various functions and tasks of the system, autonomously and/or at the initiation of a system operator. Moreover, it will further be understood that the term "system controller" could refer to a combination of one or more system operators, who manually direct the actions of the system, and one or more system microcontrollers, processors or other such devices, acting in cooperation, independently and/or in parallel, to accomplish the functions and tasks of the present invention. As used herein the term "obtain" is defined as the ability to get, acquire, and/or gain possession of the relevant data and information.

As used herein a "data storage element" is defined as a data storage device capable of storing data in a machine readable and/or human readable format. The data storage elements of the present invention may include fixed, removable or portable data storage devices, and combinations thereof. Suitable data storage devices include optical storage devices; magnetic storage devices; flash storage devices, including but not limited to storage devices comprising volatile, non-volatile, erasable, and/or programmable memory; and combinations thereof. Suitable data storage devices also include physical storage devices where data (in either a machine and/or human readable format) is integrated with and/or embedded upon a physical substrate (e.g., including but not limited to punch cards, plastic and paper).

As used herein the term "acquisition element" (i.e., historical data set acquisition element; variance model acquisition element; variance component set acquisition element; first constraint set acquisition element; product data set acquisition element; sampling manufacturing period acquisition element; estimation technique acquisition element; first probability acquisition element) is defined as that portion, or those portions, of the system that acquire data and information for use by the systems of the present invention.

The data to be acquired by the acquisition elements of the present invention may already exist in one or more formats suitable for use by the systems of the present invention, in which case the acquisition elements need only provide for the retrieval and provision of the data to the system. However, it will be understood that the data to be acquired for use by the systems of the present invention by the acquisition elements may require translation, conversion, and/or reformatting from one or more existing formats to one or more formats suitable for use by the system. In such an event, the acquisition elements of the systems of the present invention may optionally include the ability to translate, convert, and/or reformat the data to more suitable formats. It will also be understood, however, that even if the data to be acquired exists in one or more incompatible formats, the acquisition elements themselves need not comprise the data translation, conversion, and/or reformatting capabilities, but such functionality could be reserved for separate elements of the system.

Examples of suitable acquisition elements for use in the systems of the present invention include devices and software for data entry, including keyboards, touch screens and other manual text entry devices; auditory input, speech recognition and/or speech-to-text conversion devices; information acquisition and conversion devices involving the scanning of data existing in hard-copy and conversion to machine readable format through object character recognition; and devices for the retrieval, copying and/or uploading from one or more data storage devices. These devices may operate over and/or be connected to the systems of the present invention over any number of physical and/or wireless connections.

The acquisition elements of the systems of the present invention may optionally comprise the ability to select a given portion of the data or information to be acquired. As used herein the term "select" is defined as the ability of the system controller to choose specific data, information and/or options from among one or more available sets of choices. It will be understood that the actual selection of the data, information and/or option need not occur contemporaneously with the operation of the system, but may be made in advance.

In one embodiment of the present invention a system controller is presented with a set of options for each of a historical data set, a sample manufacturing period, a variance model, an estimation technique, a first constraint set, a first probability, and a product data set. The various options for each of the items may exist in one or more formats that may or may not be readily suitable for use in the systems of the present invention. Those items not readily suitable for use by the system may require translation, conversion, and/or reformatting to one or more suitable formats prior to selection and/or use.

It will be understood by one of ordinary skill in the art, however, that one or more of the options for each of the items selected from the list comprising historical data sets, sample manufacturing periods, variance models, an estimation techniques, first constraint sets, first probabilities and product data sets may be pre-selected (i.e., selected prior to system operation and/or system construction) and preprogrammed, hard-wired, or otherwise integrated with or into the systems of the present invention. In one embodiment of the present invention the first probability value selected for the system is 0.95, and this value is used for all determinations of the first target by the system. In this embodiment the value of 0.95 is preprogrammed into the system during system construction, such that the first probability acquisition element is only able to retrieve the value of 0.95 for use. In another embodiment of the present invention a set of first probability values including values of 0.80, 0.85, 0.90, 0.95, 0.99, and 0.9999 are provided and available for selection by the system controller through a graphical user interface. In yet another embodiment of the present invention the same set of first probability values are provided and available for selection by the system controller through a lookup table of the values existing in a machine readable format.

The systems of the present invention may optionally be integrated or otherwise rendered capable of communication with systems and devices for controlling the manufacturing and/or filling of prepackaged products and commodities. This integration and/or communication could provide the systems of the present invention with direct access to the data and information required for such items as the historical data set. Moreover, the integration of the systems of the present invention with systems and devices for controlling the manufacturing and/or filling of prepackaged products and commodities could allow for greater productivity and efficiency in the manufacturing and/or filling process resulting from direct, non-delayed adjustments to product manufacturing and/or fill parameters based upon the determination of the first target. According to one embodiment of the present invention a machine-readable storage medium, such as a magnetic and/or optical storage device (including but not limited to magnetic tape; floppy discs; CD-R discs; CD-RW discs; DVD-R discs; DVD-RW discs; flash drives; portable, internal, or external hard drives; and the like), comprises stored data representing sequences of instructions for the calculation of a first target. The sequences of instructions, when executed by a system controller comprised of one or more microprocessors causes the system controller to obtain a historical data set, obtain a sampling manufacturing period, obtain a variance model, and obtain an estimation technique. The data representing the sequences of instructions allow for the tasks of obtaining a historical data set, obtaining a sampling manufacturing period, obtaining a variance model, and obtaining an estimation technique to be performed in any order. The data representing the sequences of instructions causes the system to determine a variance component set using the variance model, the estimation technique, and the historical data set. The instructions cause the system to determine the first target by obtaining a first constraint set, obtaining a first probability, and obtaining a product data set. The data representing the sequences of instructions allow for the tasks of obtaining a first constraint set, obtaining a first probability, and obtaining a product data set to be conducted in any order. The instructions cause the system to calculate the first target utilizing the variance component set such that the probability of satisfying the first constraint set is at least as great as the first probability.

In another embodiment a machine-readable storage medium comprises stored data representing sequences of instructions for the calculation of a first target employing a first confidence level.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for package fill determination comprising a system controller; a data storage element; a historical data set acquisition element; a sampling manufacturing period acquisition element; a variance model acquisition element; a estimation technique acquisition element; a variance component set acquisition element; a first constraint set acquisition element; a first probability acquisition element; and a product data set acquisition element;

wherein said system controller:
(i) obtains a historical data set via said historical data set acquisition element;
(ii) obtains a sampling manufacturing period via said sampling manufacturing period acquisition element;
(iii) obtains a variance model via said variance model acquisition element;
(iv) obtains an estimation technique via said estimation technique acquisition element, wherein steps (i), (ii), (iii) and (iv) may be conducted in any order;
(v) determines a variance component set, acquired via said variance component set acquisition element, using said variance model, said estimation technique, and said historical data set; and
(vi) determines a first target by the method comprising the steps of:
a) obtaining a first constraint set via said first constraint set acquisition element;
b) obtaining a first probability via said first probability selection element;
c) obtaining a product data set via said product data set acquisition element, wherein steps (a), (b) and (c) may be conducted in any order; and
d) calculating said first target utilizing said variance component set such that the probability of satisfying said first constraint set is at least as great as said first probability.

2. The system of claim 1 additionally comprising a first target report generation element.

3. The system of claim 2 additionally comprising a first target report display element.

4. The system of claim 1 wherein in step (vi) of determining said first target, said system controller additionally obtains a first confidence level via a first confidence level acquisition element, and in sub step (d) said system controller calculates said first target utilizing said variance component set such that the probability of satisfying said first constraint set is at least as great as said first probability with said first confidence level, wherein said first constraint set, said first probability, said product data set, and said first confidence level may be obtained in any order.

5. The system of claim 1 wherein said first target is determined utilizing a method selected from the group consisting of one or more closed form equations, numerical methods, successive simulations, and combinations thereof.

6. The system of claim 5 wherein said first target is determined utilizing successive simulations.

7. The system of claim 4 wherein said first target is determined utilizing a method selected from the group consisting of one or more closed form equations, successive simulations, and combinations thereof.

8. The system of claim 7 wherein said first target is determined utilizing successive simulations.

9. The system of claim 1 wherein said first constraint set comprises a constraint selected from the group consisting of product aesthetic constraints, product promotion constraints, product packaging constraints, regulatory constraints, and combinations thereof.

10. The system of claim 9 wherein said first constraint set comprises at Least two constraints selected from the group consisting of product aesthetic constraints, product promotion constraints, product packaging constraints, regulatory constraints, and combinations thereof.

11. The system of claim 10 wherein said first constraint set comprises two separate sets of regulatory constraints.

12. The system of claim 1 wherein said variance model comprises from about 1 to about 10 variance components.

13. The system of claim 12 wherein said variance model comprises from about 1 to about 4 variance components.

14. The system of claim 13 wherein said variance model comprises 3 variance components.

15. The system of claim 1 wherein said estimation technique is selected form the group consisting of expected mean squares, maximum likelihood, and restricted maximum likelihood.

16. The system of claim 15 wherein said estimation technique is restricted maximum likelihood.

17. The system of claim 2 wherein said first target report comprises financial cost data related to the first target.

18. The system of claim 1 wherein said first probability is the range of from about 0.8 to about 1.0.

19. The system of claim 4 wherein said first confidence level is the range of from about 90.00% to about 99.99%.

20. The system of claim 2 wherein said first target report comprises financial information corresponding to the results of said first target satisfying or not satisfying said first constraint set in product fill operations.

21. A machine-readable medium having stored thereon data representing sequences of instructions, the sequences of instructions which, when executed by a system controller, cause the system controller to:
i) obtain a historical data set;
ii) obtain a sampling manufacturing period
iii) obtain a variance model;
iv) obtain an estimation technique, wherein steps (i), (ii), (iii) and (iv) may be conducted in any order;
iii) determine a variance component set using said variance model, said estimation technique, and said historical data set;
iv) determine a first target by the method comprising the steps of:
a) obtaining a first constraint set;
b) obtaining a first probability;
c) obtaining a product data set, wherein sub steps (a), (b) and (c) may be conducted in any order; and
d) calculating said first target utilizing said variance component set such that the probability of satisfying said first constraint set is at least as great as said first probability.

* * * * *

UNITED STATES PATENT AND TRADEMARK OFFICE
CERTIFICATE OF CORRECTION

| | | |
|---|---|---|
| PATENT NO. | : 7,630,778 B2 | Page 1 of 1 |
| APPLICATION NO. | : 11/369594 | |
| DATED | : December 8, 2009 | |
| INVENTOR(S) | : Brenneman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this

Second Day of November, 2010

David J. Kappos
*Director of the United States Patent and Trademark Office*